United States Patent Office 3,166,145
Patented Jan. 19, 1965

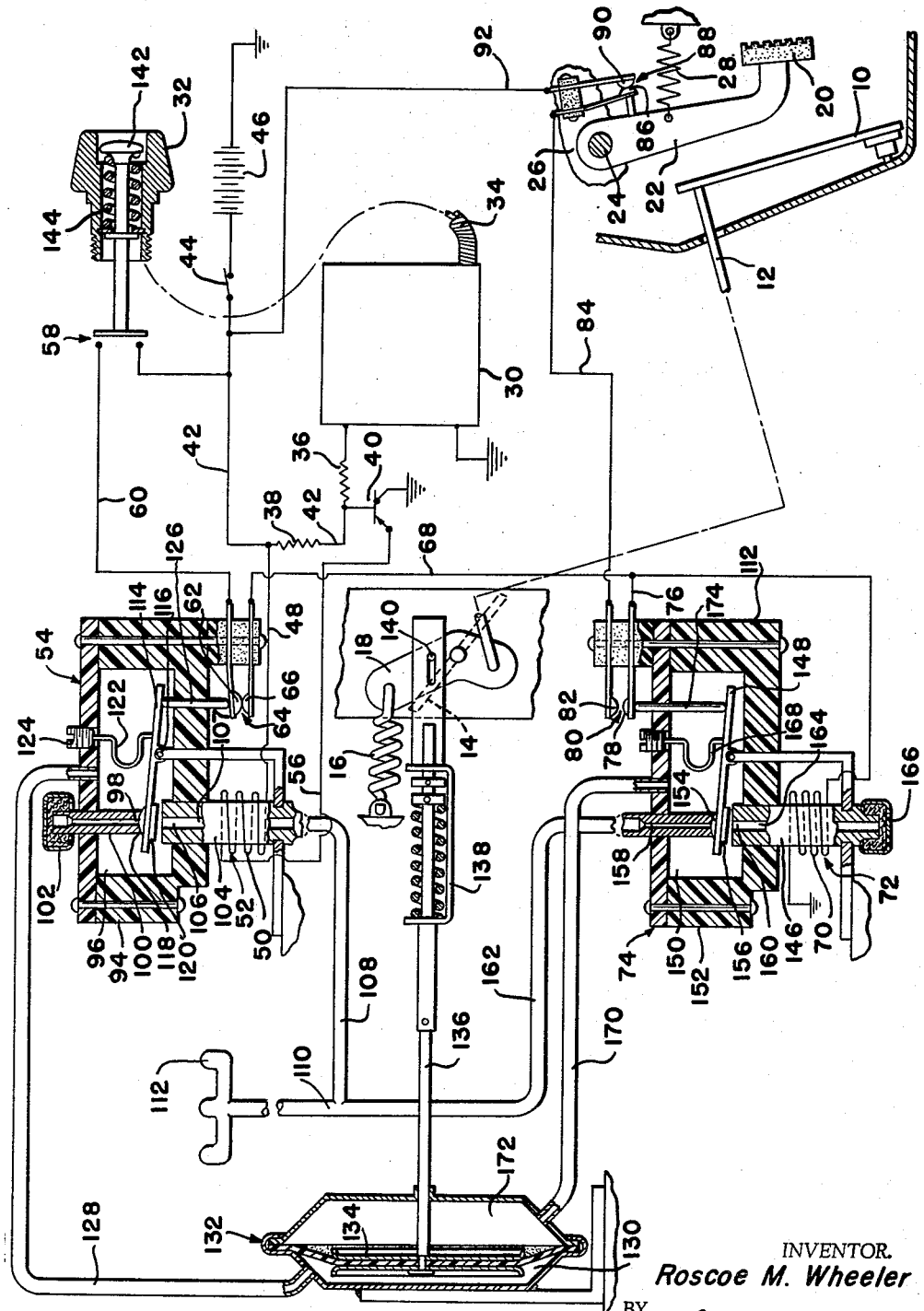

3,166,145
VEHICLE ROAD SPEED WARNING AND
SPEED CONTROL SYSTEM
Roscoe M. Wheeler, Bayport, Mich., assignor to General
Motors Corporation, Detroit, Mich., a corporation of
Delaware
Filed Apr. 29, 1963, Ser. No. 276,317
2 Claims. (Cl. 180—82.1)

The invention relates to an improved system for an automotive vehicle and particularly to a system which provides a warning to the vehicle operator when a predetermined vehicle speed is reached in one mode of operation, and in another mode of operation maintains the vehicle at a predetermined road speed under varying conditions. A system embodying the invention utilizes a speed error signal developed as a difference between a desired speed and the actual vehicle speed to generate a proportional control fluid pressure delivered to a fluid pressure actuated power unit connected to the engine throttle linkage. When the pressure is delivered to the power unit a back pressure or force is exerted through the linkage tending to close the engine throttle valve and felt by the vehicle operator as a back pressure on the accelerator pedal. When the system is operating in the road speed control mode another fluid pressure is also delivered to the power unit and opposes the proportional control fluid pressure so that the power unit acting through the throttle linkage to which it is connected moves the engine throttle valve to increase and decrease throttle opening in accordance with the speed error signal to maintain the vehicle at the set speed.

An improved system embodying the invention may be of the vehicle speed maintaining type wherein the speed maintaining lock-in condition is obtainable only after a proportional control pressure generating mechanism has become operative. After the lock-in condition is obtained it is maintained until the vehicle operator manually releases it.

A system embodying the invention more particularly includes a mechanism energized by the proportional control pressure generating mechanism to introduce the secondary pressure to the power unit only upon attainment of the set speed under manual control of the vehicle operator together with and after the vehicle operator has energized a circuit under control of the proportional pressure generating mechanism by use of a manual control.

In the preferred embodiment of the invention the speed error signal is an electrical signal generated within a predetermined vehicle speed range containing the set speed. This electrical signal has characteristics indicating not only the amount of speed error within the range but whether the error is below or above the set speed. The electrical signal is received by the proportional control pressure generating mechanism and actuates that mechanism to generate a fluid pressure having characteristics indicating similar facts to those indicated by the speed error signal. Actuation of this mechanism closes contacts in an electrical circuit containing in series a switch which must be manually closed by the operator to energize the circuit. The circuit also includes an electrically controlled valve mechanism which opens a fluid pressure conduit to deliver fluid pressure to the speed control chamber of the the power unit to place the system in the speed control mode of operation. Actuation of this valve also closes a holding circuit which holds the valve in position to maintain the speed control fluid pressure in the power unit. The holding circuit includes a switch actuated upon movement of the brake pedal of the vehicle to release the holding circuit and thereby release the speed control valve to cut off speed control fluid pressure from the power unit and thereby change the operation of the system to the speed warning mode.

The speed transducer which generates the speed error signal compares the actual vehicle speed to the set speed and generates the signal in the manner disclosed in copending application S.N. 67,820, entitled Vehicle Speed Warning and Cruise Control System, filed November 7, 1960, now Patent No. 3,088,538 and also disclosed in application S.N. 137,423, entitled Vehicle Speed Warning and Cruise Control System, filed September 11, 1961, now Patent No. 3,087,340. Reference is therefore made to these applications for details of construction and operation of a suitable speed transducer and the disclosures therein relative to the speed transducers are incorporated herein by reference.

In the drawing, the figure is a schematic diagram of a system embodying the invention, with certain elements thereof shown broken away and in section. The system is illustrated as being in the speed warning mode of operation with the vehicle at or slightly over the set speed and in condition to shift the system to the speed control mode of operation under manual control of the operator.

The usual accelerator pedal 10 is connected to a throttle rod 12 for control of the engine throttle valve 14 in the well known manner. A throttle return spring 16 is suitably attached to the throttle linkage, of which arm 18 and rod 12 are parts, and urges the engine throttle valve 14 toward the zero throttle or engine idle position. Arm 18 is attached to the throttle valve so that it moves the throttle valve under influence of throttle return spring 16 and throttle rod 12. The usual vehicle brake actuating pedal 20 is mounted on a brake pedal arm 22 suitably pivoted at 24 to a portion 26 of the vehicle body. The usual brake pedal return spring 28 urges the arm 22 to the brake release position.

The speed transducer 30 senses vehicle speed and may be set at any desired vehicle speed for either the speed warning or speed control mode of operation by the speed set knob 32 acting through the speed set drive member 34. Details of the transducer 30 are disclosed in the above noted applications. The transducer includes resistors 36 and 38 connected to transistor 40. The electrical lead 42 containing resistors 36 and 38 is connected through the ignition switch 44 to a suitable source of electrical energy, schematically illustrated as a battery 46. An electrical lead 48 is connected to lead 42 intermediate resistor 38 and ignition switch 44 and to one side of a coil 50 of the electromagnet assembly 52 which forms a part of the proportional control fluid pressure generating mechanism 54. The other end of coil 50 is connected through electrical lead 56 to transistor 40. This portion of the system and the manner of operation wherein a speed error signal is developed and impressed on coil 50 are described in greater detail in the above noted applications. It is considered sufficient to herein state that the speed error signal is generated within a constant vehicle speed range containing the set speed and is in proportion to the amount of error found upon comparison of the actual vehicle speed with the set speed. The characteristics of the signal also indicate whether the actual vehicle speed is above or below the set speed.

A normally open, manually closed, switch 58 is placed in electrical lead 60 which connects with lead 42 intermediate the connection to lead 48 and ignition switch 44. Lead 60 is also connected to one contact 62 of a normally open switch 64 which is a part of the assembly including the proportional control fluid pressure generating mechanism 54. The other contact 66 of switch 64 is connected to electrical lead 68 which connects switch 64 with the coil 70 of another electromagnet assembly 72 formed as a part of the road speed control actuating mechanism 74. Electrical lead 76 is connected to one contact 78 of a normally open switch 80 associated with speed control actuating mechanism 74. The other contact 82 of switch 80 is connected through electrical lead 84 to one contact 86 of the normally open switch 88. The other contact 90 of switch 88 is connected through electrical lead 92 to lead 42 adjacent the connection of lead 60 with lead 42.

Switch 88 is held closed by the brake pedal arm 22 so long as the brake pedal 20 is in the brake release position and opens when the vehicle brakes are applied by movement of brake pedal arm 22. It can be seen that switches 80 and 88 together with their associated electrical leads 76, 84 and 92 constitute a holding circuit so long as they are closed to keep coil 70 energized once switch 58 and switch 64 have been closed to initially energize the coil 70. This is accomplished in the manner described below in relation to speed control actuating mechanism 74.

The mechanism 54 includes a housing 94 having a pressure chamber 96 formed therein. An orifice 98 is formed in a suitable conduit 100 extending into chamber 96 and has a filtered inlet 102 so that atmospheric pressure is in conduit 100 at all times. The core 104 of electromagnet assembly 52 is constructed as a conduit with orifice 106 connecting the conduit with chamber 96. The passage 107 through core 104 forming the conduit is connected through conduit 108 to conduit 110 which in turn is connected to a suitable source of reduced pressure such as the engine intake manifold 112. Thus raw intake manifold vacuum is present in the passage 107 to the orifice 106. A valve unit 114 is pivotally mounted at 116 in chamber 96. One end of the unit is provided with a valve having oppositely disposed faces 118 and 120 so that when valve face 118 is engaged to seal orifice 98 no atmospheric pressure can enter chamber 96. At the same time valve face 120 is open relative to orifice 106 so that intake manifold vacuum is applied to chamber 96. When valve face 120 is moved by pivotal movement of valve unit 114 to close orifice 106, valve face 118 opens orifice 98. At this time engine manifold vacuum is sealed from chamber 96 and atmospheric pressure is opened to it. A spring 122 engages valve unit 114 to urge the valve face 118 against the orifice 98. A suitable spring adjuster 124 is also provided. The end of valve unit 114 containing valve faces 118 and 120 acts as an armature and is attracted by core 104 when coil 50 is energized. Core 104 is normally continually energized when the vehicle is below the speed range in which the set speed is contained. The speed error signal is provided as a cyclic interruption of the electrical current passing through coil 50 so that there is little interruption time in each cycle when there is a speed error at the low end of the speed range. As the actual vehicle speed approaches the set speed the cyclic interruption time is increased. It is preferable to have the speed error signal indicating zero speed error by a cyclic interruption time of the same duration of the cyclic closed time. Speed errors above the set speed are indicated by a greater cyclic interruption time in relation to the cyclic closed time, with the cyclic interruption time increasing relatively in relation to the amount of speed error above the set speed. Should the actual vehicle speed pass out of the speed range, the speed error signal would be a continual interruption so that coil 50 would be completely deenergized.

When coil 50 is first deenergized, indicating the attainment of a vehicle speed within the speed error sensing range, valve unit 114 pivots in a direction tending to close orifice 98 by face 118. When the interruption time interval is sufficient to permit the requisite movement of valve unit 114, it will move actuator 126 a sufficient distance while in engagement with contact 62 of switch 64 to close that switch momentarily. Lead 68 will not be energized, however, since switch 58 remains open.

The cyclic energization and deenergization of coil 50 causes similar movements of valve unit 114 so that a proportional control pressure is developed in chamber 96 having limits of atmospheric pressure and engine intake manifold pressure. This pressure is communicated through conduit 128 to the speed warning chamber 130 of the power servo 132. The pressure in chamber 130 acts on the servo diaphragm 134 to urge servo rod 136 to the left. This force is transmitted through lost motion linkage 138 and the slot and pin connection 140 to arm 18, tending to close throttle valve 14 and exerting a force on accelerator pedal 10 through rod 12 which is felt by the vehicle operator. This force warns the operator that he has attained the set speed. If he desires he may continue to accelerate above this speed and lost motion linkage 138 will permit this action. The proportional control pressure in chamber 96 and therefore in chamber 130 will continue to approach the engine intake manifold pressure, thereby exerting a greater speed warning force against the operator's foot on the accelerator pedal 10 until the vehicle speed has passed through the speed error signal generating range. Thereafter the force will be constant. If the operator desires to maintain the set speed by manual control of the accelerator pedal he may merely ride the back pressure against the pedal. If, however, he desires to shift the system into the speed control mode of operation at this time, he pushes button 142 against the force of spring 144 to close switch 58. Button 142 is illustrated as being recessed in the speed set knob 32 for convenience. Since switch 64 is being cyclically opened and closed, and may be closing approximately 1000 times per mile in accordance with the disclosure of the above applications, the circuit containing switches 58 and 64 is therefore quickly energized. Coil 70 of electromagnet assembly 72 is immediately energized and the core 146 attracts one end of the valve unit 148 which is pivotally mounted in a chamber 150 formed in the housing 152 of the road speed control actuating mechanism 74. Valve unit 148 is constructed in a manner similar to valve unit 114 and is provided with similar valve faces 154 and 156. These valve faces respectively control orifices 158 and 160. Orifice 158 is connected through conduit 162 to conduit 110 which is in turn connected to the engine intake manifold 112. Orifice 160 is formed at the end of the passage 164 in core 146. This passage extends out of the housing 152 and has a filtered inlet 166 through which atmospheric pressure is maintained in passage 164 to orifice 160. Spring 168 urges valve unit 148 to a pivoted position wherein valve face 154 normally closes orifice 158. Thus when coil 70 is not energized, atmospheric pressure is maintained in chamber 150. When coil 70 is energized as above described, valve face 156 closes orifice 160 and orifice 158 is opened. Raw intake manifold vacuum is then supplied to chamber 150 and passes through conduit 170 to the speed control chamber 172 of the power servo 132. Chamber 172 is on the other side of diaphragm 134 from speed warning chamber 130. Diaphragm 134 is then moved under influence of the proportional control pressure in chamber 130 and the intake manifold vacuum in chamber 172 to move throttle valve 14 and maintain the set vehicle speed.

As soon as valve unit 148 pivots under energization of coil 70 to close orifice 160 it also moves actuator 174 against contact 78 to close switch 80. Since switch 88 is also closed, the vehicle brake being released, the holding circuit is energized. Coil 70 is then maintained in the energized condition through the holding circuit. When the operator desires to discontinue speed control operation, he opens switch 88 by movement of the brake pedal arm 22. This immediately deenergizes coil 70, allowing spring 168 to move valve face 154 to close orifice 158. At the same time orifice 160 is opened so that air under atmospheric pressure immediately enters chamber 150, conduit 170 and cruise control chamber 172. The system is then again in the speed warning mode of operation and switch 58 must again be closed to re-set the speed maintaining mode of operation.

In the claims:

1. A vehicle road speed control comprising, means defining a constant range of vehicle speed including a selected desired vehicle speed and substantially less than the total range of vehicle speed generating a vehicle speed error signal within the constant range of vehicle speed, servo means receiving said signal and maintaining vehicle speed thereby subject to energization of a speed maintaining lock-in circuit, said circuit having normally open manually operated circuit opening and closing means and normally open circuit closing means in series with said manually operated circuit opening and closing means, said vehicle speed error signal generating means being connected to close said normally open circuit closing means when the vehicle enters said constant range of vehicle speed, and a holding circuit subject to energization of said lock-in circuit for holding said lock-in circuit energized independently of said normally open circuit closing means and said manually operated circuit opening and closing means.

2. A vehicle road speed warning and speed maintaining system comprising, a speed transducer developing a speed error signal, a fluid power servo for operating the vehicle engine throttle valve and having fluid pressure responsive output means adapted to be connected to the engine throttle valve and a housing receiving said fluid pressure responsive output means to define therein a road speed warning chamber and a road speed control chamber, a source of fluid pressure different from atmospheric pressure, first valve means connected to receive fluid pressure from said source and atmospheric pressure and further connected to said speed warning chamber to deliver a speed error reflective pressure thereto ranging between atmospheric pressure and pressure from said source, second valve means connected to receive fluid pressure from said source and atmospheric pressure and further connected to said speed control chamber to selectively deliver thereto one of said received pressures, an electrical speed maintaining lock-in and release circuit having a first manually closable normally open switch, a second normally open switch in series with said first switch and connected to be closed by said first valve means when the speed error reflective pressure is being delivered to said servo and electrical valve actuating means in series with said first and second switches for holding said second valve means in position to deliver fluid pressure from said source to said speed control chamber and a holding circuit for said electrical valve actuating means having manually openable normally closed switch means therein.

References Cited in the file of this patent

UNITED STATES PATENTS

| | | |
|---|---|---|
| 2,916,100 | Teetor | Dec. 8, 1959 |
| 2,966,224 | Teetor | Dec. 27, 1960 |
| 3,081,837 | Fiteny | Mar. 19, 1963 |